United States Patent
Lee et al.

(10) Patent No.: US 10,291,482 B2
(45) Date of Patent: May 14, 2019

(54) ECU FOR TRANSMITTING LARGE DATA IN HIL TEST ENVIRONMENT, SYSTEM INCLUDING THE SAME AND METHOD THEREOF

(71) Applicant: AJOU UNIVERSITY INDUSTRY-ACADEMIC COOPERATION FOUNDATION, Suwon-si, Gyeonggi-do (KR)

(72) Inventors: Jung Won Lee, Seoul (KR); Ki Yong Choi, Suwon-si (KR); Jeong Woo Lee, Yongin-si (KR)

(73) Assignee: AJOU UNIVERSITY INDUSTRY-ACADEMIC COOPERATION FOUNDATION, Suwon-si (KR)

(*) Notice: Subject to any disclaimer, the term of this patent is extended or adjusted under 35 U.S.C. 154(b) by 218 days.

(21) Appl. No.: 15/335,771

(22) Filed: Oct. 27, 2016

(65) Prior Publication Data
US 2017/0331699 A1    Nov. 16, 2017

(30) Foreign Application Priority Data
May 12, 2016    (KR) .................. 10-2016-0058064

(51) Int. Cl.
*H04L 12/24* (2006.01)
*H04L 12/40* (2006.01)
(Continued)

(52) U.S. Cl.
CPC ............ *H04L 41/145* (2013.01); *G05B 17/02* (2013.01); *G06F 17/5009* (2013.01);
(Continued)

(58) Field of Classification Search
CPC ....... H04L 41/145; H04L 12/40; H04L 43/50; H04L 67/12; G05B 17/02;
(Continued)

(56) References Cited

U.S. PATENT DOCUMENTS

2004/0095928 A1* 5/2004 O'Neill ................. H04L 45/02
                                                    370/389
2009/0281779 A1* 11/2009 Kajitani ................ G05B 17/02
                                                    703/7
(Continued)

FOREIGN PATENT DOCUMENTS

KR    10-2006-0054546 A    5/2006
KR    10-2015-0030881 A    3/2015

OTHER PUBLICATIONS

Korean Office Action for corresponding Application No. 10-2016-0058064 dated Mar. 14, 2017.

*Primary Examiner* — Brian S Cook
(74) *Attorney, Agent, or Firm* — Sughrue Mion, PLLC (57) ABSTRACT

An electronic control unit (ECU) for transmitting large data in a hardware-in-the-loop (HiL) simulation environment, a system including the same and a method thereof are provided. The electronic control unit for executing a HiL simulation includes an interface transmitting/receiving data associated with a simulation in link with a hardware-in-the-loop (HiL) simulator, a data storing unit storing data generated by executing the simulation, and a transmission agent fragmenting the stored data into multiple data and transmitting the multiple data and transmitting one data segment according to a fragmented order whenever repeatedly executing the simulation.

15 Claims, 8 Drawing Sheets

(51) Int. Cl.
  *G05B 17/02* (2006.01)
  *G06F 17/50* (2006.01)
  *H04L 29/08* (2006.01)
  *H04L 12/26* (2006.01)

(52) U.S. Cl.
  CPC .... *H04L 12/40* (2013.01); *G05B 2219/23446* (2013.01); *G06F 2217/86* (2013.01); *H04L 43/50* (2013.01); *H04L 67/12* (2013.01); *H04L 2012/40215* (2013.01)

(58) Field of Classification Search
  CPC ....... G05B 2219/23446; G06F 17/5009; G06F 2217/86
  USPC .......................................................... 703/13
  See application file for complete search history.

(56) References Cited

U.S. PATENT DOCUMENTS

2010/0158045 A1* 6/2010 Shin .................. H04L 12/40071
                                                                370/473
2015/0346321 A1* 12/2015 Jansen ...................... G01S 7/02
                                                                342/107

* cited by examiner

| | 11 bits | 1 | 6 bits | 8 bits | 16 bits | 2bits | |
|---|---|---|---|---|---|---|---|
| S O F | Identifier | R T R | Control Field | Data Field | CRC Field | ACK Field | E O F |

ECU FOR TRANSMITTING LARGE DATA IN HIL TEST ENVIRONMENT, SYSTEM INCLUDING THE SAME AND METHOD THEREOF

CROSS-REFERENCE TO RELATED APPLICATIONS

This application claims priority to and the benefit of Korean Patent Application No. 10-2016-0058064 filed in the Korean Intellectual Property Office on May 12, 2016, the entire contents of which are incorporated herein by reference.

TECHNICAL FIELD

The present invention relates to a large data transmitting technique, and particularly, to an ECU for transmitting large data in a HiL simulation environment, a system including the same and a method thereof.

BACKGROUND ART

In vehicular electronic devices, data is generally transmitted by using a controller area network (CAN) protocol. The CAN has a transmission speed of a maximum of 1 Mbps. In particular, since the transmission speed of 1 Mbps is guaranteed only within 40 m, the transmission speed of 1 Mbps is limited in use, but the size of the data such as a value of a temperature or an RPM is small, but the transmission speed is optimized to a role to share primary state information.

Accordingly, an additional technique is required to transmit large data such as additional information for debugging, and the like to the outside at a short period in addition to state information generated while performing the existing operation.

As a technique for overcoming a communication limit of a CAN environment and transmitting the large data, methods including data compression, data fragmentation, Ethernet frame conversion, and the like are proposed.

When a method for compressing data by using a compression algorithm, such as a delta compression technique, and the like cannot satisfy a required compression rate, loss or delay can occur as large as data which cannot be compressed during communication and when an additional operation is required due to characteristics of an embedded system having a limited system resource, the additional operation can interfere with the existing operation.

A data fragmentation technique that fragments data into pieces according to a data field size of a CAN data frame has a limit in that in the case of an ECU having a limited storage space such as a buffer in an environment in which the data is continuously generated, previously generated data can be lost and modifying an additional communication driver for modifying and using reserved bits of the CAN data frame is required.

An Ethernet frame conversion method using a conversion device has a limit in that the size of data transmittable per unit time does not increase, and as a result, the data generated at the previous time can be lost and in general, an Ethernet interface is not mounted on the ECU, and as a result, the ECU is limited in use.

Since the methods in the related art are limited in transmitting the large data to the outside by using the CAN protocol in an environment in which using a system resource is limited and separate hardware modification is unavailable, a new technique for transmitting the large data is required.

SUMMARY OF THE INVENTION

The present invention has been made in an effort to provide an ECU for transmitting large data in a HiL simulation environment, a system including the same and a method thereof which fragments a region of data generated periodically in and transmits data corresponding to the fragmented regions in an ECU where a HiL simulation is executed and transmits the data of the fragmented regions according to an order whenever the simulation is executed as many as the fragmented regions.

However, an object of the present invention is not limited to the aforementioned object, and other objects, which are not mentioned above, will be apparent to those skilled in the art from the following description.

An exemplary embodiment of the present invention provides an electronic control unit for transmitting large data, including: an interface transmitting/receiving data associated with a simulation in link with a hardware-in-the-loop (HiL) simulator; a data storing unit storing data generated by executing the simulation; and a transmission agent fragmenting the stored data into multiple data and transmitting the multiple data and transmitting one data segment according to a fragmented order whenever repeatedly executing the simulation.

The transmission agent may repeatedly execute the simulation at n times which is the same as the number of multiple fragmented data segments and transmit an n-th data segment among the multiple fragmented data segments whenever executing the n-th simulation.

The transmission agent may fragment the data generated by executing the simulation into multiple data when receiving a request message for requesting data transmission from a user terminal in link with the user terminal, and transmit one data segment at one time according to the fragmented order whenever repeatedly executing the simulation.

The transmission agent may repeat a process of transmitting a first data packet including order information according to the fragmented order whenever repeatedly executing the simulation, and transmitting a second data packet including one data segment corresponding to the order information.

The first data packet may include an information field indicating a cascading information protocol, an offset field indicating the order of transmitted data among all fragmented data, and a frame field indicating a time of data which is currently transmitted while executing each simulation.

The second data packet may include an information field indicating a data transfer protocol, a base field indicating the order of the transmitted data among all data, and a data field including the transmitted data.

The transmission agent may fragment a region storing the data into multiple regions and transmit a data segment stored in one region among the multiple fragmented regions according to the fragmented order whenever executing the simulation by repeatedly executing the simulation.

The transmission agent may transmit the data segment stored in one region among the multiple fragmented regions according to the fragmented order whenever repeatedly executing the simulation, and indicate a next fragmented region by increasing an offset indicating the region storing the data segment.

The transmission agent may determine the number of fragmented data generated by executing the simulation by considering a region of data to be transmitted, the number of messages which may be transmitted for a unit time, the size of data which may be stored in the message, and a parameter including an occupancy rate of a communication bus occupied by the existing task.

The transmission agent may transmit data by using a controller area network (CAN) protocol in link with the user terminal.

Another exemplary embodiment of the present invention provides a system for transmitting large data, including: a test executing unit transmitting/receiving data associated with a simulation in link with a hardware-in-the-loop (HiL) simulator; a data collecting unit receiving one data segment according to a fragmented order among data generated whenever executing the simulation by repeatedly executing the simulation from an electronic control unit connected with the HiL simulator; and a data storing unit sequentially storing a data segment generated by executing the simulation.

The data collecting unit may transmit a request message for requesting transmission of the data generated by executing the simulation in link with the electronic control unit, and receive one data segment according to the fragmented order among the data generated whenever repeatedly executing the simulation from the electronic control unit in response to the request message.

The request message may include an information field indicating a data request protocol, a frame field indicating a time required per one simulation, a start address field indicating a start address of data to be received, and an end address field indicating an end address of the data to be received.

The data collecting unit may repeat a process of receiving a first data packet including order information according to the fragmented order whenever repeatedly executing the simulation, and receiving a second data packet including one data corresponding to the order information.

The data collecting unit may parse the received first data packet and extract order information depending on the fragmented order, and parse the received second data packet and extract the fragmented data segments, and store the extracted data segments according to the order information.

Yet another exemplary embodiment of the present invention provides a method for transmitting large data, including: storing, by an electronic control unit, data generated by executing a simulation in link with a hardware-in-the-loop (HiL) simulator; receiving, by the electronic control unit, a request message for requesting transmission of the stored data; and fragmenting, by the electronic control unit, the stored data into multiple data and transmitting the fragmented data when receiving the request message and transmitting one data segment according to a fragmented order whenever repeatedly executing the simulation.

In the transmitting, the simulation may be repeatedly executed at n times which are the same as the number of multiple fragmented data segments and an n-th data segment among the multiple fragmented data segments may be transmitted whenever executing the n-th simulation.

In the transmitting, a region storing the data may be fragmented into multiple regions and a data segment stored in one region among the multiple fragmented regions may be transmitted according to the fragmented order whenever repeatedly executing the simulation.

Still yet another exemplary embodiment of the present invention provides a method for transmitting large data, including: requesting, by a user terminal, transmission of data generated by executing a simulation in link with a hardware-in-the-loop (HiL) simulator; receiving, by the user terminal, one data segment according to a fragmented order among data generated whenever executing the simulation by repeatedly executing the simulation from an electronic control unit connected with the HiL simulator; and sequentially storing, by the user terminal, the data segments generated by executing the received simulation.

As described above, according to exemplary embodiments of the present invention, a region of data generated periodically in an ECU where a—HiL simulation is executed is fragmented and data corresponding to the fragmented regions are transmitted and the data of the fragmented regions are transmitted according to an order whenever the simulation is executed as many as the fragmented regions, and as a result, large data which is larger than the size of data transmittable by a CAN protocol can be transmitted to the outside without loss without using high-speed networks such as Ethernet, and the like.

Data cannot be stored in a separate storage space and large data which are periodically changed can be collected in a HiL test environment in which an additional system resource cannot be used so as not to influence the existing operation.

In the HiL test environment, the large data of a memory which are periodically changed can be collected and provided to a developer as debugging information.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Hereinafter, an electronic control unit (ECU) for transmitting large data in a hardware-in-the-loop (HiL) simulation environment, a system including the same and a method thereof according to exemplary embodiments of the present invention will be described with reference to the accompanying drawings. Parts required for appreciating operations and actions according to the present invention will be primarily described in detail.

In describing constituent elements of the present invention, different reference numbers may refer to like elements depending on the drawing, and like reference numerals may refer to like elements even though like elements are shown in different drawings. However, even in this case, it is not meant that a corresponding constituent element has a different function according to an exemplary embodiment or has the same function in different embodiments, and a function of each constituent element may be determined based on a description of each constituent element in a corresponding embodiment.

In particular, the present invention proposes a new scheme in which an electronic control unit which executes a hardware-in-the-loop (HiL) simulation fragments periodically generated data into multiple regions by considering a transmission environment in order to transmit the data without a loss and thereafter, transmits the data of the fragmented regions according to an order whenever repeatedly executing the simulation as many as the fragmented regions.

Figure 1:
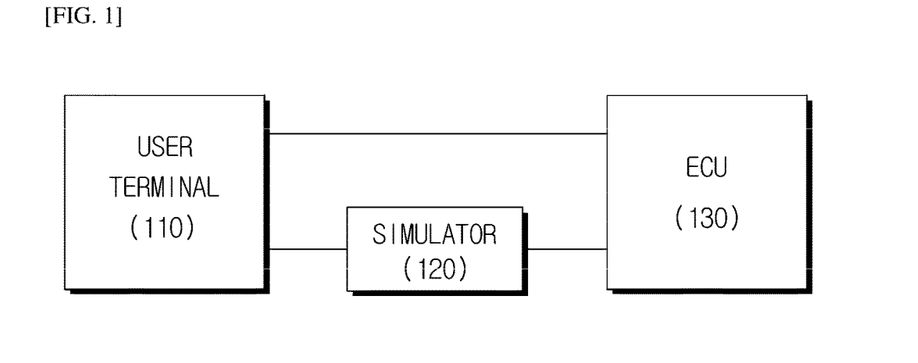
FIG. 1 is a diagram illustrating a system for executing a HiL simulation according to an exemplary embodiment of the present invention.

FIG. 1 is a diagram illustrating a system for executing a HiL simulation according to an exemplary embodiment of the present invention.

As illustrated in FIG. 1, the system for executing the HiL simulation according to the present invention may include a user terminal 110, a simulator 120, and an electronic control unit (ECU) 130.

The user terminal 110 may control a simulation of the ECU connected with the simulator in link with the simulator 120 and receive data generated as a result of executing the simulation. That is, the user terminal 110 may acquire data regarding a periodic change of a memory as operation information of the ECU 130 that executes the HiL simulation and the acquired data may be provided to a developer as debugging information through an appropriate processing procedure.

In this case, the user terminal 110 receives the data generated by executing the simulation from the ECU 130 and repeatedly executes the simulation to fragment the data generated by executing the simulation into multiple fragmented data segments and receive the data in a fragmented order.

The simulator 120 as a HiL simulator may execute the simulation in link with the ECU 130 and provide the data generated as the result of executing the simulation to the user terminal 110. That is, the simulator 120 executes the simulation in link with the ECU 130 according to control of the user terminal 110 and receives the data generated by executing the simulation from the ECU 130 and provides the received data to the user terminal.

The electronic control unit 130 may execute the simulation in link with the simulator 120, store the data generated as the result of executing the simulation in a memory, and when the electronic control unit 130 receives a request for transmission of the data stored in the memory from the user terminal 110, the electronic control unit 130 may provide the data.

In this case, the electronic control unit 130 transmits the data generated by executing the simulation and repeatedly executes the simulation to fragment the data generated by executing the simulation into multiple data segments and transmit one data segment according to the segmented order.

Figure 2:
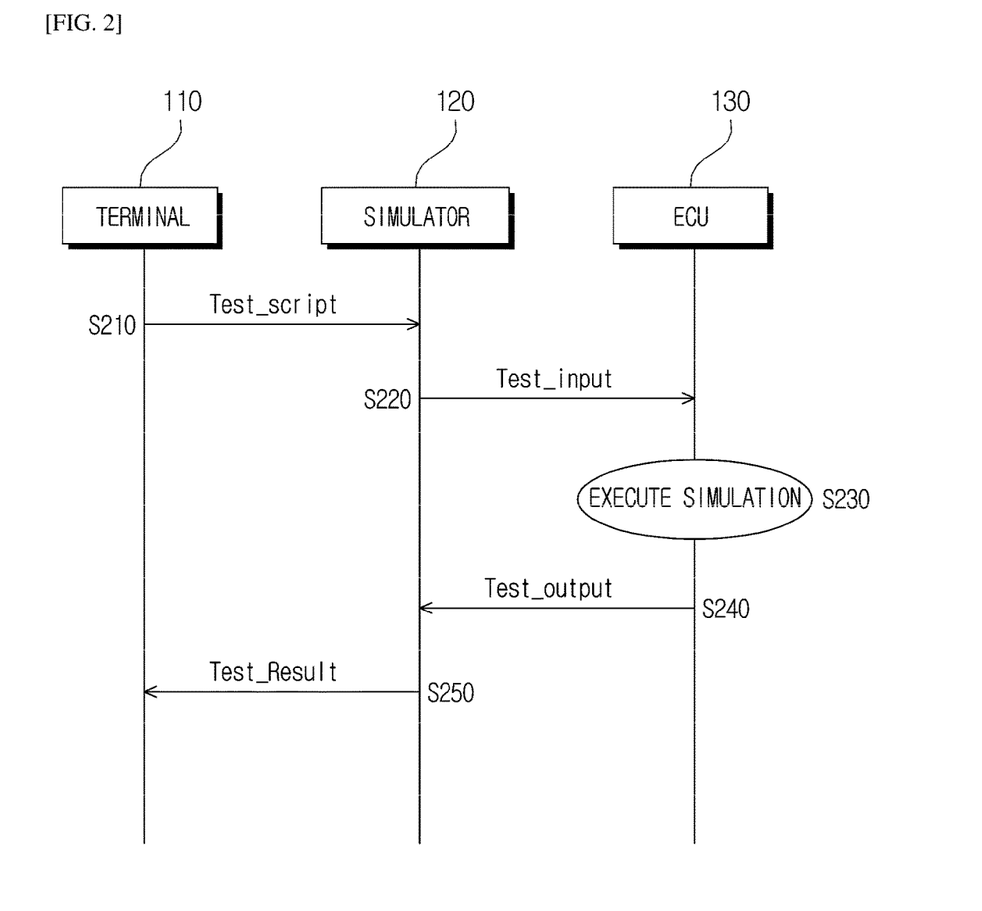
FIG. 2 is a diagram for describing a HiL simulation execution principle according to an exemplary embodiment of the present invention.

FIG. 2 is a diagram for describing a HiL simulation execution principle according to an exemplary embodiment of the present invention.

As illustrated in FIG. 2, the user terminal 110 may generate a first request message test-script for requesting execution of the simulation by operating a key of a user or a menu and transmit the generated first request message to the simulator 120.

In this case, the first request message may include information for setting an environment of the simulation.

Next, when the simulator 120 receives the first request message test-script, the simulator 120 may generate a second request message test_input and transmit the generated second request message to the ECU 130.

Next, when the ECU 130 receives the second request message test_input, the ECU 130 may execute the simulation based on the received second request message and store the data generated by executing the simulation and generate a first result message test_output including the result of executing the simulation and transmit the generated first result message to the simulator 120.

In this case, the first result message may include state information for announcing the result of executing the simulation, a region storing the data, that is, a start address, a end address, and the like.

Next, when the simulator 120 receives the first result message test_output, the simulator 120 may generate a second request message test_result and transmit the generated second result message to the user terminal 110.

Figure 3:
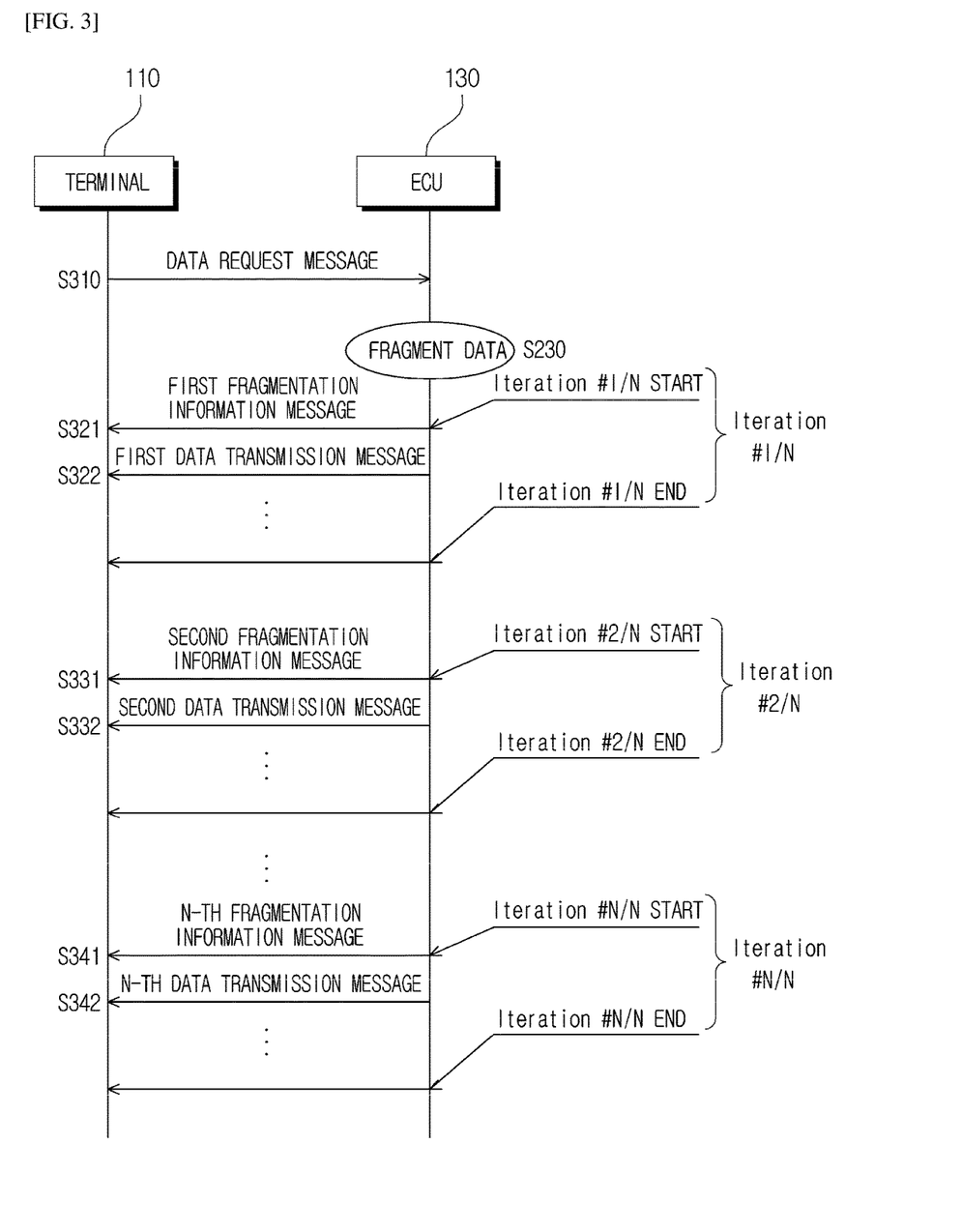
FIG. 3 is a diagram illustrating a large data transmitting process according to an exemplary embodiment of the present invention.

FIG. 3 is a diagram illustrating a large data transmitting process according to an exemplary embodiment of the present invention.

As illustrated in FIG. 3, the user terminal 110 may generate a data request message for requesting transmission of the data generated by executing the simulation and transmit the generated data request message to the ECU 130.

Next, the ECU 130 may fragment the stored data into multiple segments and generate a first fragmentation information message including order information corresponding to a first data segment according to the segmented order and transmit the generated first fragmentation information message to the user terminal 110.

Then, the ECU 130 may generate a first data transmission message including the first data segment and transmit the generated first data transmission message to the user terminal 110.

Next, the ECU 130 may generate a second fragmentation information message including order information corresponding to a second data segment according to the segmented order and transmit the generated second fragmentation information message to the user terminal 110.

Then, the ECU 130 may generate a second data transmission message including the second data segment and transmit the generated second data transmission message to the user terminal 110.

Next, the ECU 130 may generate a N-th fragmentation information message including order information corresponding to a N-th data segment according to the segmented order and transmit the generated N-th fragmentation information message to the user terminal 110.

Then, the ECU 130 may generate a N-th data transmission message including the N-th data segment and transmit the generated N-th data transmission message to the user terminal 110.

In this case, the user terminal and the ECU may transmit data by using the CAN protocol and in the present invention, only a data field of a data frame defined in the CAN protocol is intended to be used.

Figure 4:
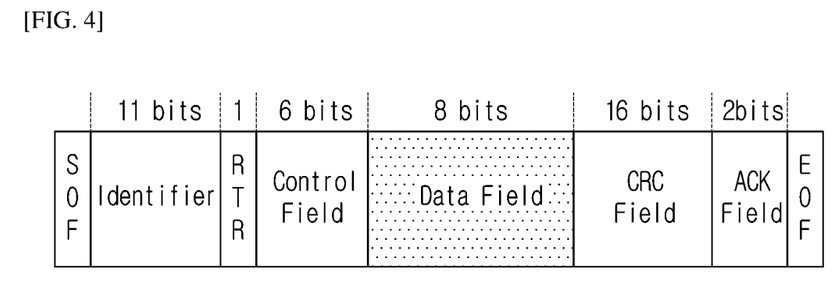
FIG. 4 is a diagram illustrating a format of a data frame defined in a basic CAN protocol.

FIG. 4 is a diagram illustrating a format of a data frame defined in a basic CAN protocol.

As illustrated in FIG. 4, the data frame may include a start of field (SOF) 410, an identifier of field 420, an RTR of field 430, a control of field 440, a data of field 450, a CRC of field 460, an ACK of field 470, and an end of field (EOF) 480.

The SOF 410 as a field indicating the start of the message announces that transmitting the message starts to all nodes and 1 bit is allocated to the SOF 410. The node, that is, the ECU is synchronized through the SOF.

The identifier of field 420 as a field indicating a message identifier is allocated with 11 bits.

The RTR of field 430 as a remote transmission request bit is allocated with 1 bit. For example, when an RTR bit is "0", the RTR bit indicates the data frame and when the RTR bit is "1", the RTR bit indicates a remote transmission request.

The control of field 440 is constituted by 6 bits and constituted by R0 and R1 having two "0" values reserved for later use, and a 4-bit data length code indicating the number of bytes of the data of field.

The data of field 450 as a field including data to be transmitted is allocated with 8 bytes.

The CRC of field 460 is constituted by 16 bits and has a code for detecting an error of data.

The ACK of field 470 is constituted by 2 bits and indicates whether the message is successfully received.

The end of field 480 as a field indicating the end of the message is allocated with 1 bit.

Figure 5:
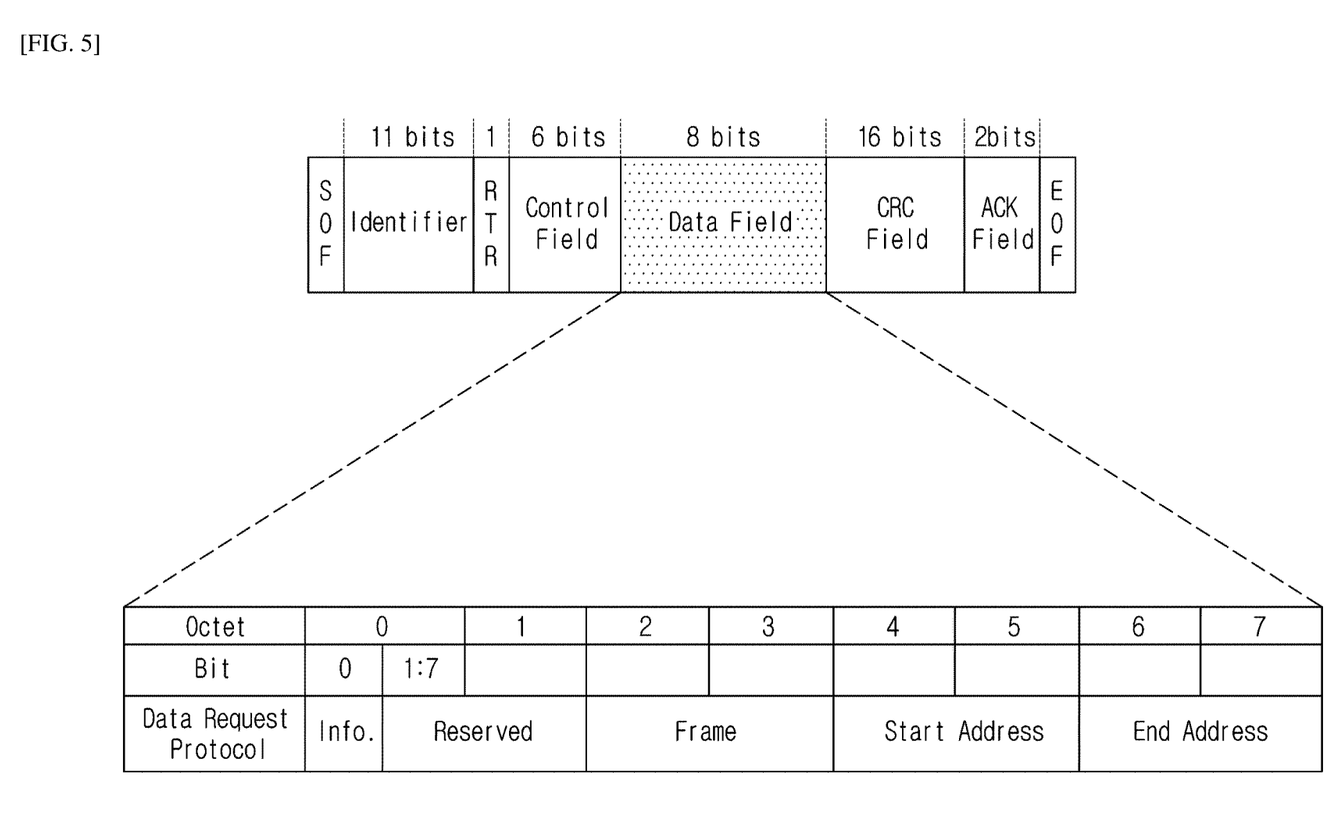
FIG. 5 is a diagram illustrating a format of a data request message according to an exemplary embodiment of the present invention.

FIG. 5 is a diagram illustrating a format of a data request message according to an exemplary embodiment of the present invention.

As illustrated in FIG. 5, the data request message (data request protocol) may be used for providing transmission environment information collected from the user to an agent of the ECU that manages the data to be transmitted and requesting a data region to be collected.

An information field is constituted by 1 bit and is set to 1 to indicate the data request protocol.

A frame field is constituted by 2 bytes and indicates a value acquired by converting a time required per simulation into a unit time, that is, an operation period of a main task.

The start address field is constituted by 2 bytes and indicates a start address of a data region to be received.

The end address field is constituted by 2 bytes and indicates an end address of the data region to be received.

In this case, when a value of each address is not expressed as provided two bytes, a reserved field is extended and used. When the reserved field is extended and used, the value of each address may be expressed as up to $2^{22}-1$.

Figure 6:
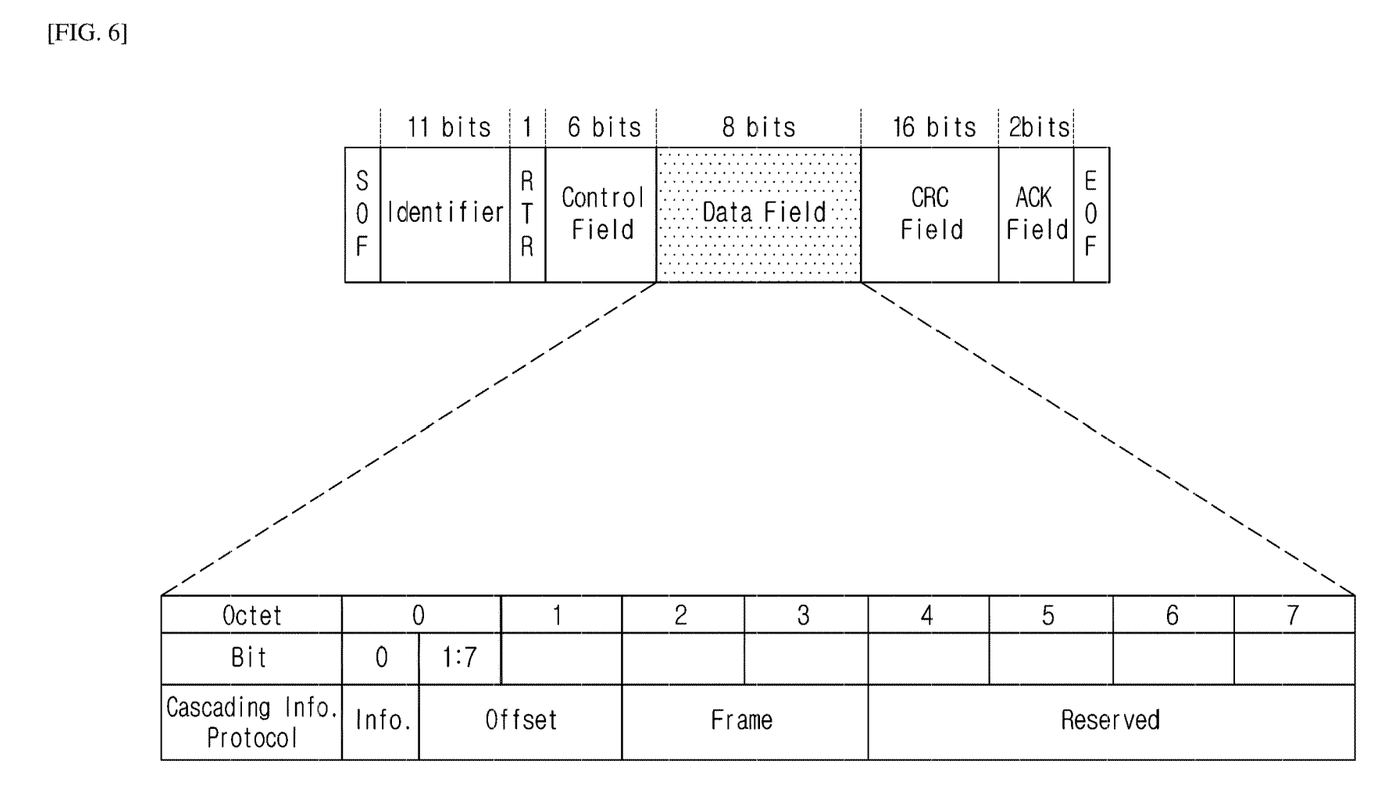
FIG. 6 is a diagram illustrating a format of a fragmented information message according to an exemplary embodiment of the present invention.

FIG. 6 is a diagram illustrating a format of a fragmented information message according to an exemplary embodiment of the present invention.

As illustrated in FIG. 6, the fragmented information message (cascading information protocol) may be used for providing information on a frame to which a data piece currently belongs and offset when transmitting data.

The information field is constituted by 1 bit and is set to 1 to indicate the cascading information protocol.

An offset field indicates an order of the transmitted data among all fragmented data.

A frame field indicates a value acquired by converting the time required per simulation (from a simulation start time to a data transmission time) into the unit time, that is, the operation period of the main task.

Figure 7:
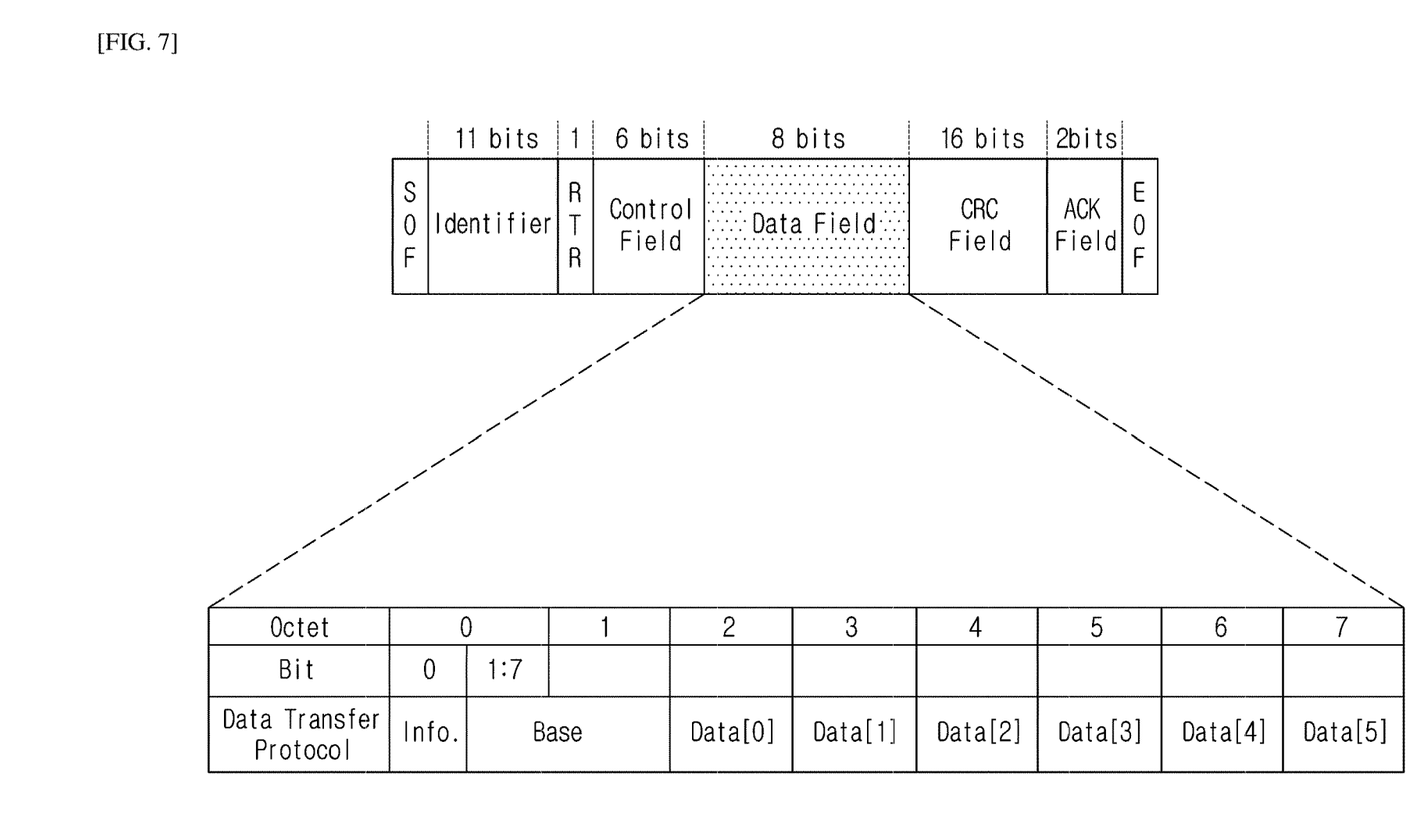
FIG. 7 is a diagram illustrating a format of a data transmission message according to an exemplary embodiment of the present invention.

FIG. 7 is a diagram illustrating a format of a data transmission message according to an exemplary embodiment of the present invention.

As illustrated in FIG. 7, the data transmission message (data transfer protocol) may be used for transmitting the data while including the order information in the same piece.

An information field is constituted by 1 bit and is set to 0 to indicate the data transfer protocol.

A base field indicates the order information in the same piece.

The data field is constituted by 6 bytes and indicates consecutive data by setting a base as the start.

Figure 8:
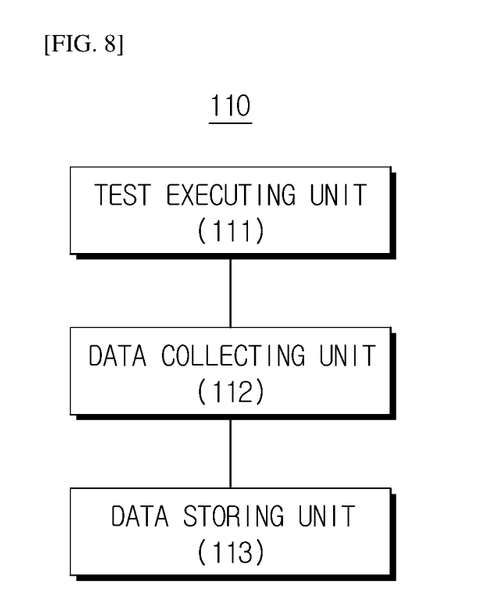
FIG. 8 is a diagram illustrating a detailed configuration of a user terminal illustrated in FIG. 1.

FIG. 8 is a diagram illustrating a detailed configuration of a user terminal illustrated in FIG. 1.

As illustrated in FIG. 8, the user terminal 110 according to the present invention may be configured to include a test executing unit 111, a data collecting unit 112, a data storing unit 113, and the like.

The test executing unit 111 may transmit/receive data associated with the simulation in link with the HiL simulator.

The data collecting unit 112 may receive one datum at one time according to the fragmented order among the data generated whenever executing the simulation by repeatedly executing the simulation from the ECU connected with the HiL simulator.

In this case, an algorithm that defines an operation of the data collecting unit 112 is shown in [Table 1] given below.

TABLE 1

```
1:  procedure ReceiveDataSegments
2:  begin
3:      if Cascading information packet received then
4:          CIP <- Cascading information packet
5:          F <- CIP.Frame
6:          Offset <- CIP.Offset
7:
8:          while new cascading information packet arrives do
9:              if Data packet received then
10:                 DP <- Data packet
11:                 Base <- DP.Base
12:                 Data[ ] <- DP.Data[0] to DP.Data[5]
13:                 Save Data[ ] to external database starts from Base
14:             end if
15:         end while
16:     else
17:         Waiting for cascading information packet
18:     end if
19: end
```

Referring to [Table 1] given above, first, the data collecting unit that receives a fragmentation information packet collects a value corresponding to a frame and an offset containing order information of data received from the corresponding packet (line 4-6).

Next, a process of parsing order information and data in a data transfer packet received until a new fragmentation information packet is received and storing the order information and the data in a separate database according to the order by using the frame and the offset is repeated until all data are received (line 8-15).

The data storing unit 113 may sequentially store the data generated by performing the simulation.

Figure 9:
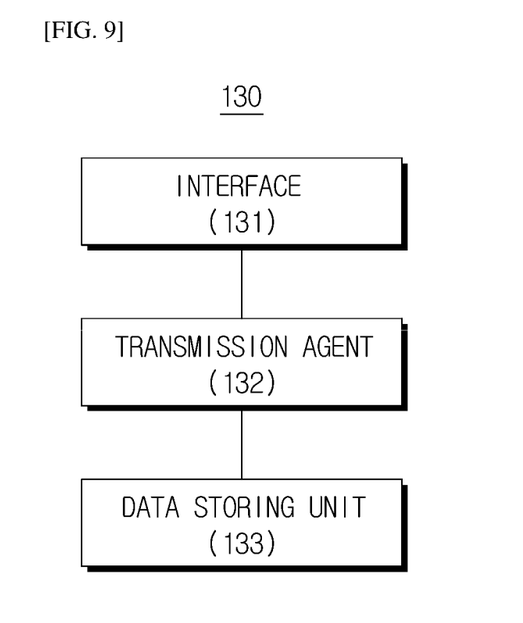
FIG. 9 is a diagram illustrating a detailed configuration of an electronic control unit illustrated in FIG. 1.

FIG. 9 is a diagram illustrating a detailed configuration of an electronic control unit illustrated in FIG. 1.

As illustrated in FIG. 9, the electronic control unit 130 according to the present invention may be configured to include an interface 131, a transmission agent 132, a data storing unit 133, and the like.

The interface 131 may transmit/receive the data associated with the simulation in link with the HiL simulator.

The transmission agent 132 may fragment the stored data into multiple data and transmit the multiple data and transmit one datum at one time according to the fragmented order whenever executing the simulation by repeatedly executing the simulation.

For example, the transmission agent 132 repeatedly executes the simulation at n times which is the same as the number of multiple fragmented data and transmits n-th data among the multiple fragmented data whenever executing the n-th simulation.

In particular, the transmission agent 132 fragments the region storing the data into multiple regions, stores data stored in one region among the multiple fragmented regions according to the fragmented order whenever executing the simulation by repeatedly executing the simulation, and thereafter, increases an offset indicating the region storing the data to indicate a next fragmented region.

In this case, an algorithm that defines an operation of the transmission agent 132 is shown in [Table 2] given below.

TABLE 2

```
1:  procedure SendDataSegments
2:  begin
3:      if Data request packet received then
4:          RP <- Data request packet
5:          F, SA, EA <- RP.Frame, RP.StartAddress, RP.EndAddress
6:          X, Y <- 0
7:          S <- Calculate the number of Segments
8:
9:          while Y < S do
10:             while X < F do
11:                 Send cascading information packet
12:                 Transmit Y^th data segment
13:                 X <- X + 1
14:             end while
15:             X <- 0, Y <- Y+1
16:         end while
17:     else
17:         Waiting for data request packet
18:     end if
19: end
```

Referring to [Table 2] given above, when the transmission agent first receives the data request packet containing a request of the user from the data collecting unit, the transmission agent parses a request packet to obtain an execution time of one simulation, and the start address and the end address of the data (lines 3 to 7).

Next, after a current frame and a current offset are stored in the fragmentation information packet and transmitted whenever the operation period of the main task elapses, data corresponding thereto is transmitted. In this case, the data is transmitted by using the data transfer protocol (lines 11 to 13).

Next, when execution of one simulation is completed, the next data region is indicated by increasing the current offset by 1 (line 15) to transmit the data corresponding to each offset by repeating the above process until all regions storing the data are transmitted.

The data storing unit 133 may store the data generated by executing the simulation.

Figure 10:
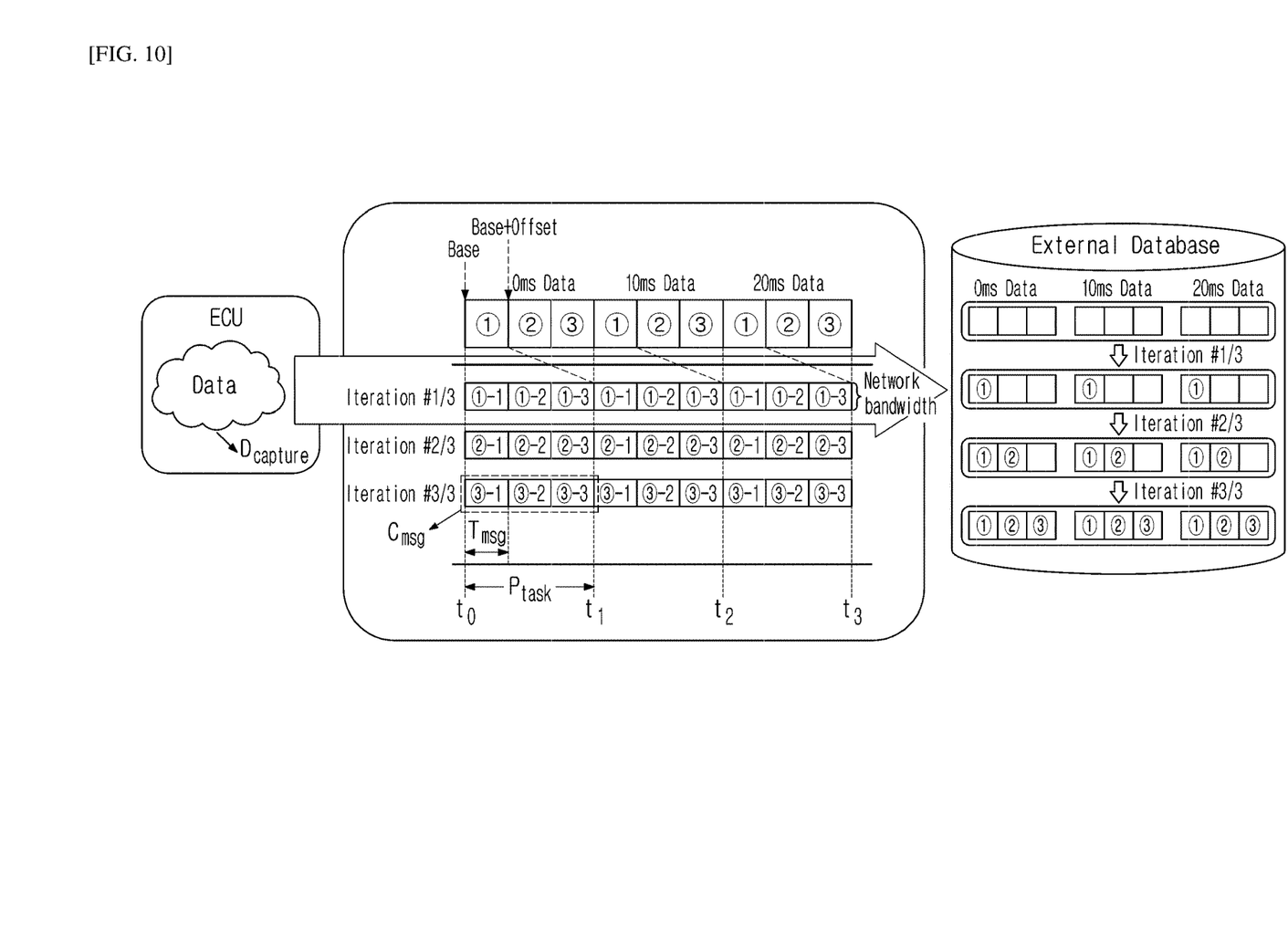
FIG. 10 is a diagram for describing a large data transmission principle according to an exemplary embodiment of the present invention.

FIG. 10 is a diagram for describing a large data transmission principle according to an exemplary embodiment of the present invention.

As illustrated in FIG. 10, a process is illustrated, in which when the large data is periodically generated in the ECU, the transmission agent fragments the large data into multiple data segments to transmit the data to an external database.

Herein, $P_{task}$ represents the operation period of the main task of the system and $T_{msg}$ represents a minimum of time required for successfully transmitting one CAN data packet to a receiving side.

For example, when new data is periodically generated in memory regions ①, ②, and ③ every $P_{task}$ from a time of $t_0$ to a time of $t_3$, the size of the data which is periodically generated every unit time corresponds to ①, ②, and ③ and data at the previous time, which is not stored in a separate storage space immediately disappears.

In this case, the region of the data which may be successfully transmitted every $P_{task}$ by a limit of CAN communication corresponds to ①. The data of the corresponding region is refragmented into size units which may be loaded in the data region of one packet and transmitted while being fragmented into a total of 3 (①-1, ①-2, and ①-3) messages.

In this case, the number of data segments may be determined by using [Equation 1] given below.

$$\text{\# of Segments} = \frac{D_{capture}}{C_{msg} \times D_{msg} \times (1 - OCC)} \quad \text{[Equation 1]}$$

Where, $D_{capture}$ represents a region of data to be transmitted, $C_{msg}$ represents the number of messages which may be transmitted for a unit time, $D_{msg}$ represents the size of data except for order information which may be stored in one message, and OCC represents an occupancy rate of a communication bus occupied by the existing operation. $C_{msg}$ which represents the number of messages which may be transmitted for the unit time is shown in [Equation 2].

$$C_{msg} = P_{task}/T_{msg} \quad \text{[Equation 2]}$$

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An electronic control unit for transmitting large data, the electronic control unit comprising:
   an interface transmitting/receiving data associated with a simulation in link with a hardware-in-the-loop (HiL) simulator;
   a data storing unit storing data generated by executing the simulation; and
   a transmission agent fragmenting the data into multiple data and transmitting the multiple data,
   wherein the transmission agent transmits one data segment according to a fragmented order whenever repeatedly executing the simulation,
   wherein the transmission agent receives a request message for requesting data transmission and transmits each of a first data packet and a second data packet through a data field in a data frame defined in a network protocol,
   wherein the transmission agent (i) fragments the data generated by executing the simulation into multiple data when receiving the request message for requesting data transmission from a user terminal in link with the user terminal and (ii) transmits, to the user terminal, one data segment at one time according to the fragmented order whenever repeatedly executing the simulation, and
   wherein the transmission agent repeats a process of (i) transmitting, to the user terminal, the first data packet including order information according to the fragmented order whenever repeatedly executing the simulation and (ii) transmitting, to the user terminal, the second data packet including one data segment corresponding to the order information.

2. The electronic control unit of claim 1, wherein the transmission agent repeatedly executes the simulation at n times which is the same as the number of multiple fragmented data segments and transmits an n-th data segment among the multiple fragmented data segments whenever executing the n-th simulation.

3. The electronic control unit of claim 1, wherein the first data packet includes an information field indicating a cascading information protocol, an offset field indicating the order of transmitted data among all fragmented data, and a frame field indicating a time of data which is currently transmitted while executing each simulation.

4. The electronic control unit of claim 1, wherein the second data packet includes an information field indicating a data transfer protocol, a base field indicating the order of the transmitted data among all data, and a data field including the transmitted data.

5. The electronic control unit of claim 1, wherein the transmission agent fragments a region storing the data into multiple regions and transmits a data segment stored in one region among the multiple fragmented regions according to the fragmented order whenever executing the simulation by repeatedly executing the simulation.

6. The electronic control unit of claim 5, wherein the transmission agent
   transmits the data segment stored in one region among the multiple fragmented regions according to the fragmented order whenever repeatedly executing the simulation, and
   indicates a next fragmented region by increasing an offset indicating the region storing the data segment.

7. The electronic control unit of claim 1, wherein the transmission agent determines the number of fragmented data generated by executing the simulation by considering a region of data to be transmitted, the number of messages which may be transmitted for a unit time, the size of data which may be stored in the message, and a parameter including an occupancy rate of a communication bus occupied by the existing task.

8. The electronic control unit of claim 1, wherein the transmission agent transmits data by using a controller area network (CAN) protocol in link with the user terminal.

9. A system for transmitting large data, the system comprising:
   a test executing unit transmitting/receiving data associated with a simulation in link with a hardware-in-the-loop (HiL) simulator;
   a data collecting unit receiving one data segment according to a fragmented order among data generated whenever executing the simulation by repeatedly executing the simulation from an electronic control unit connected with the HiL simulator; and
   a data storing unit sequentially storing a data segment generated by executing the simulation,
   wherein the data collecting unit transmits a request message and receives each of a first data packet and a second data packet through a data field in a data frame defined in a network protocol,
   wherein the data collecting unit (i) transmits, to the electronic control unit, a request message for requesting transmission of the data generated by executing the simulation in link with the electronic control unit and (ii) receives, from the electronic control unit, one data segment according to the fragmented order among the data generated by executing the simulation whenever repeatedly executing the simulation in response to the request message for requesting transmission of the data, and wherein the data collecting unit repeats a process of (i) receiving the first data packet including order information according to the fragmented order whenever repeatedly executing the simulation and (ii) receiving the second data packet including one data segment corresponding to the order information.

10. The system of claim 9, wherein the request message includes an information field indicating a data request protocol, a frame field indicating a time required per one simulation, a start address field indicating a start address of data to be received, and an end address field indicating an end address of the data to be received.

11. The system of claim 9, wherein the data collecting unit
parses the received first data packet and extracts order information depending on the fragmented order, and
parses the received second data packet and extracts the fragmented data segments, and stores the extracted data segments according to the order information.

12. A method for transmitting large data, the method comprising:
storing, by an electronic control unit, data generated by executing a simulation in link with a hardware-in-the-loop (HiL) simulator;
receiving, by the electronic control unit, a request message for requesting transmission of the data; and
fragmenting, by the electronic control unit, the stored data into multiple data and transmitting, by the electronic control unit, the fragmented data when receiving the request message,
wherein the transmitting the fragmented data includes transmitting one data segment according to a fragmented order whenever repeatedly executing the simulation,
wherein the electronic control unit receives a request message for requesting data transmission and transmits each of a first data packet and a second data packet through a data field in a data frame defined in a network protocol,
wherein the electronic control unit (i) fragments the data generated by executing the simulation into multiple data when receiving the request message for requesting data transmission from a user terminal in link with the user terminal and (ii) transmits, to the user terminal, one data segment at one time according to the fragmented order whenever repeatedly executing the simulation, and
wherein the electronic control unit repeats a process of (i) transmitting the first data packet including order information according to the fragmented order whenever repeatedly executing the simulation and (ii) transmitting the second data packet including one data segment corresponding to the order information.

13. The method of claim 12, wherein the simulation is repeatedly executed at n times which is the same as the number of multiple fragmented data segments and an n-th data segment among the multiple fragmented data segments is transmitted whenever executing the n-th simulation.

14. The method of claim 12, wherein a region storing the data is fragmented into multiple regions and a data segment stored in one region among the multiple fragmented regions is transmitted according to the fragmented order whenever repeatedly executing the simulation.

15. A method for transmitting large data, the method comprising:
requesting, by a user terminal, transmission of data generated by executing a simulation in link with a hardware-in-the-loop (HiL) simulator;
receiving, by the user terminal, one data segment according to a fragmented order among data generated whenever executing the simulation by repeatedly executing the simulation from an electronic control unit connected with the HiL simulator; and
sequentially storing, by the user terminal, the data segments generated by executing the simulation,
wherein the user terminal transmits a request message and receives each of a first data packet and a second data packet through a data field in a data frame defined in a network protocol,
wherein the user terminal (i) transmits, to the electronic control unit, a request message for requesting transmission of the data generated by executing the simulation in link with the electronic control unit and (ii) receives, from the electronic control unit, one data segment according to the fragmented order among the data generated by executing the simulation whenever repeatedly executing the simulation in response to the request message for requesting transmission of the data, and
wherein the user terminal repeats a process of (i) receiving the first data packet including order information according to the fragmented order whenever repeatedly executing the simulation and (ii) receiving the second data packet including one data corresponding to the order information.

* * * * *